Feb. 23, 1960    N. A. GUSSACK    2,926,048
SLIDE WITH SHOCK LOCKS
Filed Dec. 5, 1958
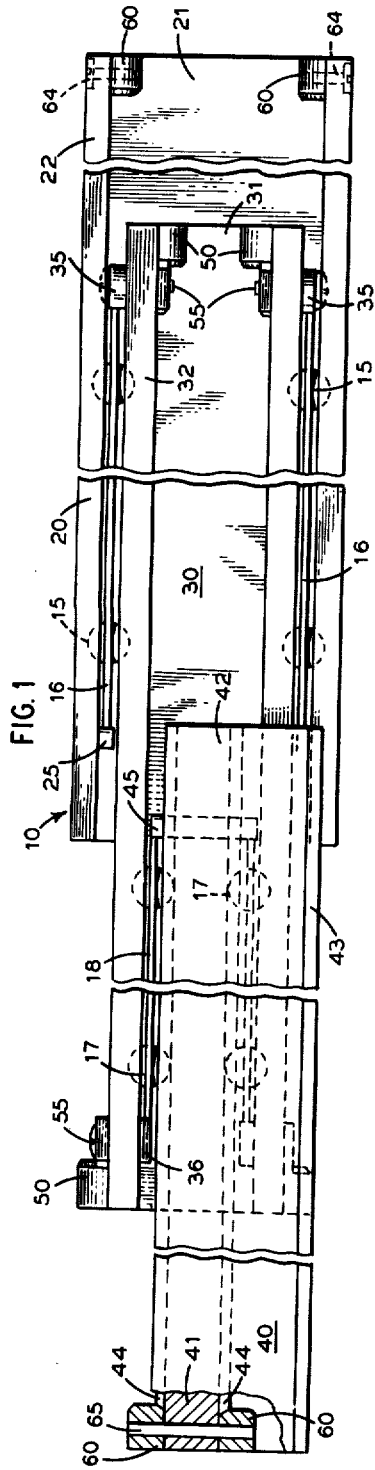
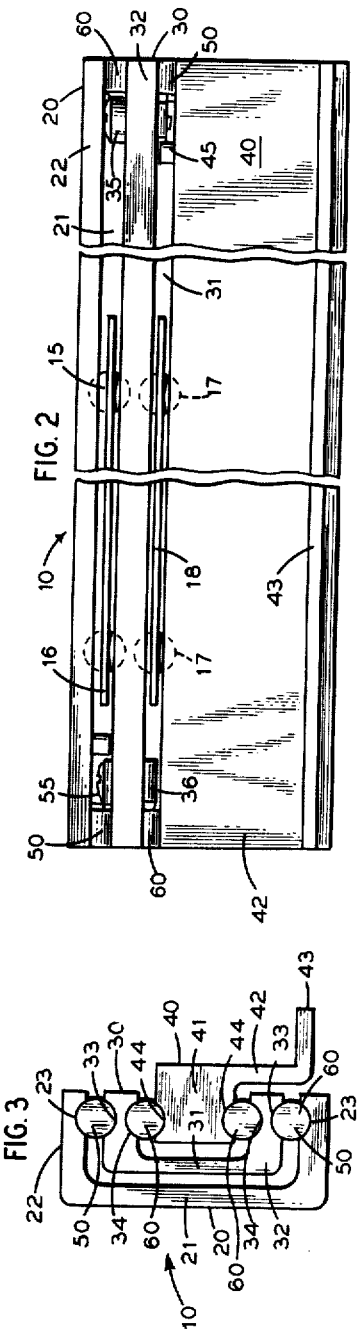
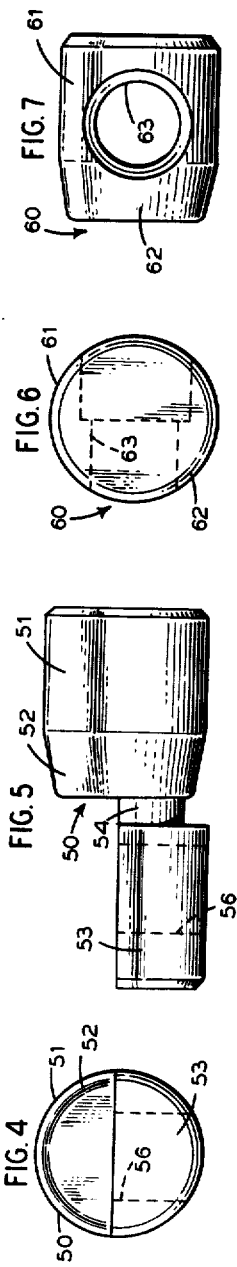
INVENTOR.
Nathan A. Gussack
BY
*Irving Seidman*
ATTORNEY

United States Patent Office 2,926,048
Patented Feb. 23, 1960

2,926,048

SLIDE WITH SHOCK LOCKS

Nathan A. Gussack, Yonkers, N.Y., assignor to Grant Pulley & Hardware Corporation, West Nyack, N.Y., a corporation Application December 5, 1958, Serial No. 778,434

8 Claims. (Cl. 308—3.8)

This invention relates to drawer slides of the type having two or more slide elements relatively movable longitudinally on anti-friction bearing means disposed between cooperating or mating track surfaces on the elements. More particularly, the invention relates to novel shock lock means for reducing ball depression into the slide members of elements when in the closed or retracted position.

In slides with balls forming the anti-friction bearing means between the elements, when the slide is stationary under a relatively heavy load, the balls tend to indent the track, particularly where the slide elements are a relatively lightweight and softer metal such as aluminum and some of its alloys. These indentations result in rough operation of the slide as the balls move along the tracks and over the indentation.

In Patent No. 2,801,887, issued August 6, 1957, to Milton P. Gussack, there is shown and described a slide in which certain of the elements have blocks secured to their ends mounting projecting cylindrical pins with tapered ends. When the slide is closed, these pins wedge between the facing track surfaces to reduce the weight on the balls and thus reduce the aforementioned indenting of the track surface.

In accordance with the present invention, an improved mounting arrangement of such shock lock pins or blocks is provided, this mounting arrangement being simpler, more easily assembled, and lighter in weight than that of the Gussack patent. More specifically, in the invention arrangement, the mounting blocks are eliminated and the shock lock pins or blocks are secured directly to the slide elements.

For an understanding of the invention principles, reference is made to the following description of a typical embodiment thereof as illustrated in the accompanying drawing.

In the drawing:

Fig. 1 is an inside elevation view of a slide incorporating the invention, in the extended position;

Fig. 2 is a similar view with the slide closed or retracted;

Fig. 3 is an end elevation view of the slide;

Figs. 4 and 5 are enlarged end and side elevation views of one form of shock lock pin used in the slide of Figs. 1–3; and Figs. 6 and 7 are similar views of another form of shock lock pin used in such slide.

Referring to Figs. 1, 2 and 3, a slide 10 is shown by way of illustrative example only, as the invention may be used with any type of slide having anti-friction bearings, such as balls for example, engaged in the facing track surfaces. The particular slide 10 shown comprises a laterally outer support element or supporting channel track member 20, an intermediate support element or channel track member 30, and a laterally inner support element or drawer mounting member 40 of Z-shape.

Outer member or element 20 has a vertical base 21 and somewhat thicker flanges 22 whose inner surfaces have arcuate cross-section track surfaces 23 formed therealong.

Intermediate element 30 also has a vertical base 31 and thicker flanges 32. Flanges 32 have arcuate cross-section track surfaces 33 facing track surfaces 23, and arcuate cross-section track surfaces 34 along their inner surfaces. Element 30 is movable longitudinally of element 20 on balls 15 mounted in spacers 16 and engaged in track surfaces 23 and 33. Stop pins 25 on flanges 22, in cooperation with stop pins 35 on flanges 32, limit extension of elements 20 and 30 by engagement with retainers 16.

In the particular slide 10 selected for illustration, inner or drawer-mounting element 40 comprises a relatively massive substantially square cross-section flange 41, a vertical web 42, and an inwardly projecting drawer-supporting flange 43. The upper and lower horizontal surfaces of flange 41 are formed with arcuate cross-section track surfaces 44 aligned with track surfaces 34.

Track surfaces 34, 44 receive balls 17 set in retainers 18. Relative outward extension of element 40 with respect to intermediate element 30 is limited by engagement of retainers 18 with stop pins 36, on element 30, and stop pins 45 on element 40.

In accordance with the invention, when slide 10 is retracted, the load is reduced from balls 15 and 17 by virtue of shock lock pins wedging into the facing arcuate cross-section track surfaces, these shock lock pins being shown in Figs. 4–7. Two forms of shock lock pins are used in slide 10, the long pins 50 of Figs. 4 and 5 and the short pins 60 of Figs. 6 and 7.

Long pins 50 comprise cylindrical bearing portions 51 having tapered inner ends 52, and semi-cylindrical mounting portions 53 joined to portions 51 by reduced neck portions 54. Mounting portions 53 have apertures 56 for receiving attaching screws or bolts 55.

Short pins 60 have cylindrical bearing portions 61 and tapered inner ends 62, and portions 61 are diametrically apertured, as at 63, to receive attaching screws 64 or mounting pins 65.

Long pins 50 are secured to the outer ends of intermediate element 30 with the cylindrical surfaces of portions 53 seating in track surfaces 33. These long pins are also secured to the inner ends of elements 30 with portions 53 seating in track surfaces 34.

Short shock lock pins 60 are secured to the inner ends of support element 20, seating in track surfaces 23 and secured by screws 64. Pins 60 are secured to the outer end of mounting element 40 by pins 65 extending through flange 41, pins 60 seating in track surfaces 44.

The cylindrical portions 51 and 61 of pins 50 and 60, respectively, have radii just slightly greater than the radii of balls 15 and 17. Consequently, when slide 10 is retracted, pins 50 and 60 wedge into the facing track sections by virtue of tapered surfaces 52 and 62, and reduce the load from balls 15 and 17. In addition, due to such wedging action, the three elements are locked together as a unit in the retracted position. As the shock lock pins are mounted directly on the flanges of the slides, resting in the track surfaces, the mounting blocks previously thought necessary, are completely eliminated along with their mass and increased assembly expense.

While a specific embodiment of the invention has been shown and described in detail to illustrate the application of the invention, it will be understood that the invention may be embodied otherwise without departing from such principles.

What is claimed is:

1. A slide comprising, in combination, a support element having flanges formed with track surfaces; a second element movable longitudinally relative to said support element and having track surfaces facing said first-mentioned track surfaces; balls disposed between said elements and seated in said track surfaces; and shock lock elements individually secured directly to said flanges and having portions seated in the track surfaces of said flanges; said portions, upon retraction of said slide, seating in the track surfaces of said second element to reduce the load from said balls.

2. A slide comprising, in combination, a support element having flanges formed with track surfaces; a second element movable longitudinally relative to said support element and having track surfaces facing said first-mentioned track surfaces; balls disposed between said elements and seated in said track surfaces; shock lock elements individually secured directly to said flanges of said support element at one end of the slide and having portions seated in the track surfaces of said flanges; said portions, upon retraction of said slide, seating in the track surfaces of said second element to remove the load from said balls; and shock lock elements individually secured directly to the second element at the opposite end of the slide and having portions seated in the track surfaces thereof; said second-mentioned portions, upon retraction of said slide, seating in the track surfaces of said flanges to reduce the load from said balls.

3. A slide as claimed in claim 2 in which the track surfaces of said second element are formed in the outer sides of flanges of said second element; track surfaces formed on the inner sides of said second element flanges; a third element movable longitudinally of said second element and having track surfaces facing said last-mentioned track surfaces; balls disposed between said second and third elements and seated in the facing track surfaces thereof; and shock lock elements individually secured directly to said flanges of said second element and having portions seated in the track surfaces on the inner sides of said flanges; said portions of said last-mentioned pins, upon retraction of said slide, seating in the track surfaces of said third element to reduce the load from said second-mentioned balls.

4. A slide as claimed in claim 3 in which said last-mentioned pins are at such one end of the slide; and shock lock elements individually secured directly to said third element at such opposite end of the slide and having portions seated in the track surfaces thereof; the portions of said last-mentioned pins, upon retraction of said slide, seating in the track surfaces on the inner sides of the flanges of said second element to reduce the load from said second-mentioned balls.

5. A slide as claimed in claim 1 in which said portions are cylindrical and have radii exceeding that of said balls.

6. A slide comprising, in combination, a support member; a second member movable relative to said support member; said members being movably interrelated by balls located in facing grooved surfaces in the two members; and shock lock pins secured and seated directly in the grooved surfaces of one member and, upon retraction of the members, engaging the grooved surfaces of the other member to reduce the load from said balls.

7. A slide as claimed in claim 6 including a third member movable relative to said second member on balls located in facing grooved surfaces of said second and third members; and shock lock pins secured and seated directly in the grooved surfaces of one of said second and third members and, upon retraction of the slide, engaging the grooved surfaces of the other of said second and third members to reduce the load from said last-mentioned balls.

8. A slide as claimed in claim 6 in which said pins are cylindrical and have tapered inner ends.

References Cited in the file of this patent

UNITED STATES PATENTS

| | | |
|---|---|---|
| 1,005,055 | Miller | Oct. 3, 1911 |
| 2,382,363 | Walters | Aug. 14, 1945 |
| 2,653,072 | Press | Sept. 22, 1953 |
| 2,801,887 | Gussack | Aug. 6, 1957 |